United States Patent [19]

Third et al.

[11] Patent Number: 5,846,664
[45] Date of Patent: *Dec. 8, 1998

[54] POROUS METAL STRUCTURES AND PROCESSES FOR THEIR PRODUCTION

[75] Inventors: Christine E. Third; Stephen F. J. Corbin, both of Edmonton; Prasad S. Apte, St. Albert, all of Canada

[73] Assignee: Westaim Technologies, Inc., Fort Sasketchewan, Canada

[ * ] Notice: The term of this patent shall not extend beyond the expiration date of Pat. No. 5,592,686.

[21] Appl. No.: 779,318

[22] Filed: Jan. 6, 1997

Related U.S. Application Data

[63] Continuation of Ser. No. 506,492, Jul. 25, 1995, Pat. No. 5,592,686.

[51] Int. Cl.⁶ .................................................... B22F 7/02
[52] U.S. Cl. .............................. 428/550; 428/547; 419/2; 419/6; 419/36; 419/37; 419/40; 419/54; 419/55
[58] Field of Search .............................. 419/2, 6, 36, 37, 419/40, 54, 55

[56] References Cited

U.S. PATENT DOCUMENTS

| | | | |
|---|---|---|---|
| 1,919,730 | 7/1933 | Koenig et al. | 419/2 |
| 2,937,938 | 5/1960 | Fiedler et al. | 75/20 |
| 4,569,821 | 2/1986 | Duperray et al. | 419/2 |
| 4,732,551 | 3/1988 | East et al. | 425/79 |
| 5,590,383 | 12/1996 | Sekhar et al. | 419/2 |
| 5,592,686 | 1/1997 | Third et al. | 419/2 |

*Primary Examiner*—Daniel J. Jenkins
*Attorney, Agent, or Firm*—Arne I. Fors; Joan Kerfoot

[57] ABSTRACT

A process is provided for the manufacture of porous metal components. The process involves preparing a colloidal suspension comprising a metal-containing powder in admixture with a binder system, and a plasticizer in an organic solvent. Optionally, a particulate pore forming agent may be added to the suspension. The suspension is cast into a thin sheet and air dried to thereby form a tape. The tapes are layered and formed by compacting at predetermined pressures to laminate the tapes, thus forming a green body. Optionally, a second pore-forming agent may be introduced between, or associated with, the tape layers. The green body is heated at a controlled rate to form a brown body, and finally sintered under controlled conditions to produce the finished component.

14 Claims, No Drawings

POROUS METAL STRUCTURES AND PROCESSES FOR THEIR PRODUCTION

This application is a continuation of application Ser. No. 08/506,492, filed Jul. 25, 1995, now U.S. Pat. No. 5,592,686.

FIELD OF THE INVENTION

The present invention relates to a process for the fabrication of engineered porous metal structures having controlled microporosity and macroporosity. The invention additionally extends to the porous metal structures produced by the process.

BACKGROUND OF THE INVENTION

At the present time powder metallurgy techniques are utilized for the fabrication of engineered porous metal structures. Typically, such porous metal components are designed having particular properties and for specific applications. The utility of the components extends to battery materials, friction parts, electronic and electrical components, and the like. However, with expanding markets, applications for specialty porous metal products are constantly increasing and diversifying.

Broadly, powder metallurgy processes involve powder synthesis, compaction and then sintering of the structural constituents. Such processes encompass powder sintering, slip forming, slip casting and fibre metallurgy. (Porous Metals. V. Shapovalov MRS Bulletin April 1994).

Powder sintering consists of introducing the metal powder starting material into a die, compacting it, and partially sintering the compressed powder at a selected temperature to attain the desired porosity. This process has inherent disadvantages. Controlled sintering at low temperatures and/or the use of a coarse powder particle size are detrimental to the mechanical strength of the formed component. Furthermore, pore size is limited by particle size, large pores requiring the use of large particles which do not sinter well. Also, the density of pressed powder parts can be non-uniform. Deleteriously, too, using conventional powder metallurgy, it is difficult to produce thin-walled structures because of the weakness of the green body. Also, producing a porous metal product exhibiting controlled pore geometry is usually not feasible.

Exemplary of conventional prior art is the disclosure of U.S. Pat. No. 3,311,505 of a gas electrode, adapted for use in a fuel cell, which electrode is made up of a sintered metal substrate having a formed surface deposit of carbon thereon. The substrate exhibits a porous volume representing forty to eighty percent of its apparent volume.

Porous nickel plates useful for electrochemical devices may be produced by the process described in U.S. Pat. No. 3,796,565 issued to Hancock et al. Additionally, in U.S. Pat. No. 3,799,808 to H. A. Hancock, there is disclosed an elongated, self-supporting porous nickel plate. The process for producing the porous nickel plate comprises applying a layer of slurry containing nickel powder, a volatile liquid and a binder to a thermally decomposable carrier film. The volatile fraction is evaporated to provide a dry layer of nickel powder in admixture with the binder. The dry layer is pressed into a network of reinforcing lines and sintered to thereby volatilize the binder and carrier. The disadvantages of these nickel plates resides, fundamentally, in their lack of mechanical strength especially in the green body state.

Diverging somewhat, processes for the fabrication of ceramic components are various and well-documented in the literature. Amongst such processes is the tape casting process which is primarily known for the manufacture of ceramics used in electronic applications as described by Mistler, R. E. et al. (1978) Tape Casting of Ceramics, in : Ceramic Processing Before Firing G. Y. Onoda and L. L. Hench, eds., Wiley-Interscience, 411–448.

Tape casting techniques involve, in general, preparing a colloidal suspension comprising a ceramic powder, a binder system, a plasticizer and a solvent. The suspension is cast into a thin sheet, and air dried yielding a green body. The tape is subjected to a burnout-cycle to remove pyrolysable slurry additives forming a friable brown body which is subsequently sintered to yield the final product.

With the changing demands for porous metal products, there has arisen a need for more precisely engineered components, which as outlined above, the existing powder metallurgy processes do not fully meet.

SUMMARY OF THE INVENTION

A primary objective of the present invention lies in the provision of metal components ranging in porosity from substantially fully dense to approximately ninety five percent porous using a process which is founded upon tape casting techniques.

It is a further objective of the invention to provide engineered porous metal components having controlled pore distribution.

It is an additional objective of the invention to provide engineered metal components having diverse and complex architectural structures with preselected pore morphologies, predetermined dimensional specifications and having close dimensional tolerances. Furthermore, the components can be produced having specific compositions, mechanical strengths, geometries and pore distributions.

The instant invention also extends to novel processes whereby all of the above described porous metal components may be manufactured.

The utility of the components is directed to such diverse parts as battery electrodes, friction absorbing surfaces, electronic and electrical components, heat exchanger parts and the like.

In accordance with the present invention, in its broadest aspect, there is provided a process for the production of a porous metal component. Initially, a colloidal suspension comprising at least one metal powder having a median particle size which is chosen to produce partial densification less than 300 microns (micrometers), in admixture with a binder system, a plasticizer, and a solvent is prepared. The colloidal suspension is cast into a thin sheet and air dried to form a tape having preselected pliability properties. A predetermined number of tape layers is stacked and compacted between rollers, or layered in a die, or otherwise preformed and laminated. Lamination takes place at pressures ranging from between about 5 to 60 MPa at temperatures in the range of between about 25° to 80° C. for a time effective to laminate said layers of tape and form a green body. The green body is heated at a controlled rate, to temperatures in the range of between about 300° to 600° C. for a time effective to remove the pyrolysable additives and form a brown body. If necessary the brown body is deoxidized by heating it in a reducing atmosphere under conditions effective to reduce formed metal oxides. The brown body is heated to temperatures in the range of between about 700° to 1400° C. whereby sintering can take place to thereby form a porous metal structure.

Using this above described process, the green body exhibits increased mechanical strength and flexibility over conventional processes, which is especially useful for thin walled structure. In addition, the tape formulation is so chosen so as to provide improved formability in the green state.

In a second broad embodiment of the invention, a pyrolysable particulate pore-forming agent is included in the colloidal suspension. Thus, there is provided a process for the production of a porous metal component having a controlled pore distribution. Initially, a colloidal suspension comprising at least one metal powder having a particle size less than 300 microns, in admixture with a binder system, a plasticizer, a solvent and the pore forming agent is prepared. The colloidal suspension is cast into a thin sheet and air dried to form a tape having preselected pliability properties. A predetermined number of tape layers is stacked and compacted between rollers, or layered in a die, or otherwise preformed and laminated. Lamination takes place at pressures ranging from between about 5 to 60 MPa at temperatures in the range of between about 25° to 80° C. for a time effective to laminate said layers of tape and form a green body. The green body is heated at a controlled rate, at temperatures effective by thermal decomposition to remove the pyrolysable additives including the pore forming agent and form a brown body. If necessary the brown body is deoxidized by heating it in a reducing atmosphere under conditions effective to reduce formed metal oxides. The brown body is sintered at temperatures in the range of between about 700° to 1400° C. to thereby form a porous metal structure having controlled microporosity.

The particulate pore forming agents must be insoluble in the selected solvent, preferably undergoing progressive thermal degradation during the burnout cycle and be essentially residue free by the completion of the said cycle.

This second aspect extends to a process for producing a porous metal product having both controlled microporosity and macroporosity. Microstructure is controlled by varying the composition and amount of the pore forming agent. Macrostructure is controlled by selected layering of the tapes (which are provided with differing porosities) and green body forming thereof.

Beneficially, in contradistinction to powder metallurgy processes, these porous metal products having graded microporosity can be prepared without the need for the labor intensive and inaccurate alteration of the particle size of the metal powder.

In a third broad embodiment of the invention, there is provided a process for the production of a porous metal component having controlled macroporosity. Initially, a colloidal suspension comprising at least one metal powder having a particle size less than 300 microns, in admixture with a binder system, a plasticizer, and a solvent is prepared. The colloidal suspension is cast into a thin sheet and air dried to form a tape having preselected pliability properties. A predetermined number of tape layers is stacked and compacted between rollers, or layered in a die, or otherwise preformed. One or more pyrolysable pore forming agents are introduced into the preform prior to lamination. Lamination takes place at pressures ranging from between about 5 to 60 MPa at temperatures in the range of between about 25° to 80° C. for a time effective to laminate said layers of tape and form a green body. The green body is heated at a controlled rate, at temperatures effective to remove the pyrolysable additives and to thermally decompose any included pore forming agent and form a brown body. If necessary the brown body is deoxidized by heating it in a reducing atmosphere under conditions effective to reduce formed metal oxides. The brown body is sintered at temperatures in the range of between about 700° to 1400° C. to thereby form a porous metal structure having controlled macrostructure.

In this third embodiment of the invention, the pore forming agents would comprise such two or three dimensional elements, which may be selectively configured. Such agents would include ash-free paper, meshes, fibres or the like.

In yet a fourth extension of the process, there is provided a process for the production of engineered porous metal components having controlled microporosity and macroporosity. Initially, a colloidal suspension comprising at least one metal powder having a particle size less than 300 microns, in admixture with a binder system, a plasticizer, a solvent and a first pyrolysable, pore forming agent is prepared. The colloidal suspension is cast into a thin sheet and air dried to form a tape having preselected pliability properties. A predetermined number of tape layers is stacked and compacted between rollers, or layered in a die, or otherwise preformed and laminated. A second pyrolysable pore forming agent is introduced into the preform prior to lamination. Lamination takes place at pressures ranging from between about 5 to 60 MPa at temperatures in the range of between about 25° to 80° C. for a time effective to laminate said layers of tape and form a green body. The green body is heated at a controlled rate, at temperatures effective to remove the pyrolysable suspension additives and pore forming agents and form a brown body. If necessary the brown body is deoxidized by heating it in a reducing atmosphere under conditions effective to reduce formed metal oxides. The brown body is sintered at temperatures in the range of between about 700° to 1400° C. to thereby form an engineered porous metal structure having controlled microporosity and macroporosity.

The criteria determining the viability of first and second pore forming agents would be identical to those detailed hereabove for the second and third embodiments respectively.

The process is well adapted for the production of thin walled structures. Other advantages of the process lie in the ease of handling of the green body and the ability to rapidly prototype new structures without the requirement for the expensive dies essential to powder metallurgy processes.

Unlike any known prior art porous metal structures it has somewhat surprisingly been found feasible to create three-dimensional architectural structures by cutting patterns in the tape or controlling the distribution of the pore-forming agents.

DESCRIPTION OF THE PREFERRED EMBODIMENT

Methods of fabrication of porous metal components, porous metal components having preselected microporosity and macroporosity, and complex, architecturally structured porous metal components having controlled microporosity and macroporosity will now be described.

A colloidal suspension (slurry) of a metal powder, containing at least one metal, in admixture with a pyrolysable binder system, a plasticizer and a volatile solvent, preferably organic, is initially prepared. In colloidal processing, the metal powder is first milled in a slurry to break down soft agglomerates present in the starting powder, separate the fine particles and obtain a uniform distribution of the powder within the slurry. Once this is achieved, binders and plasticizers are added and mixed until dissolved in the slurry.

Any suitable sinterable metal powder, selected from nickel, copper, cobalt, molybdenum, titanium, iron, and any fine metal-containing powder and the like may be utilized. Alternatively, sinterable, mixed metal powder or metal-containing systems may be used. The particle size of the metal powder ranges from 0.5 to 300 microns. The amount of metal powder utilized is such as to make up between about five and sixty percent of the volume of the green body and approximately one hundred percent by volume of the final sintered component.

A suitable binder system, compatible with the metal powder, comprising a binder and optionally a dispersant is used.

The pyrolysable binder is selected from polymerized alcohols, and butyryl and acrylic resins, such as polymethylmethacrylate. The binder content ranges from 5 to 10 weight percent of the slurry.

A pyrolysable dispersant, in an effective amount ranging from 0.5 to 10.0 weight percent of the slurry, is selected, such as Menhaden from fish oil and Hypermer KD1™.

Suitable pyrolysable plasticizers such as butylbenzyl phthalate (Santicizer160™), polyethylene glycol, or various phthalates such as diethylene, triethylene or dioctyl phthalate, are added to the slurry in amounts ranging from between about 1.5 to 5 weight percent of the slurry.

Appropriate solvents would include toluene, methyl ethyl ketone or ethanol or combinations thereof. However, the range of solvents usable in tape casting processes are extensive and also include various alcohols exemplary of which are isopropanol, methanol, as well as hexane, ethyl acetate and trichloroethylene. The solvent content of the slurry ranges from about 25 to 35 weight percent.

Two articles entitled "The Role of Slip Additives in Tape-Casting Techniques" by R. Moreno : Part 1—Solvents and Dispersants (American Ceramic Society Bulletin Volume 71 No.10 October 1992 pp.1521–1531) and Part II Binders and Plasticizers Volume 71 No. 11 November 1992 pp. 1647–1657) respectively detail more extensively possible slurry additives.

The particulate, pyrolysable pore-forming agent is introduced to the colloidal suspension at this stage. Such pore-forming agents may be selected from, for example, graphite, cornstarch, polyethylene and polypropylene and would have a particle size suitable to provide the desired pore size and in an amount effective to provide the desired degree of porosity in the portion, or layer of the tape making up the finished product. It is essential that the pore forming agent utilized have the desired particle shape or form, be insoluble in the selected solvent, provide a controlled burn out and be essentially residue free at the completion of the burnout cycle.

The thus formed colloidal suspension is poured onto a release film, such as Mylar™ film, to form a sheet, using a doctor blade to control the sheet thickness. The sheet is dried at ambient temperature, the solvents being evaporated under a fume hood to form a tape. This drying method is functional to maintain a uniform particle distribution within the tape. The dried tape is separated from the release film.

The pliability properties of the thus formed tapes can be adjusted by varying the amount and composition of the slurry additives, in particular the binder system and plasticizer. The binder per se plays a significant role in providing strength to the green body.

The formed tape would typically have a thickness ranging from 0.05 to 2 millimetres At this stage, the tape may be processed in one of several ways.

In a first method the desired shape is punched, or cut, from the tape using conventional equipment. A second pore forming agent may then be introduced either in a tape layer, or as a two or three dimensional component. Typically, this pore-forming agent is selected from a pyrolysable material, follows a progressive burnout pyrolysis and which following the burnout cycle stage is residue-free. Exemplary, suitable pore-forming agents would comprise ash-free paper, meshes, elongate fibrous materials and so on. Several layers of the cut shaped tape pieces are then stacked in a die and compacted by a press. Lamination takes place as described below.

In a second method the layers of tape are stacked and deformed through rollers. This method lends itself to sheet and continuous production methods. Again, a pore-forming agent may be introduced between or associated with the layers as described supra.

Subsequent forming operations, such as deep drawing, or drilling or punching may be employed to produce the finished green part.

Clearly, the pore-forming agent may be added to the suspension, or during the layering process or in both stages.

The lamination pressure ranges from 5 to 60 MPa. Compaction temperature ranges from about 25° C. to 75° C. Preferably, compaction is undertaken at ambient temperature.

The green body is then heated, at a controlled rate, or as stated otherwise, in an incremental predetermined stepped rate, in air, or nitrogen, to temperatures ranging from about 300° C. to 600° C., for a time ranging from 8 to 24 hours. This heating stage, termed the burnout cycle, is effective to remove the pyrolysable organic additives, including the pore forming agents, by thermal decomposition thereby forming a 'brown' body. The heating is conducted slowly so as to burn off the organics without introducing cracks or blisters into the part. The brown body consists of a porous metal powder and is fragile.

It is sometimes necessary to conduct a deoxidation step if the burnout cycle was conducted in air. The deoxidation step involves heating the brown body in hydrogen, or a suitable reducing atmosphere, for a time ranging from 0.3 to 3.0 h and at a temperature ranging from 400° to 700° C.

The brown body is then sintered in a sintering furnace in an atmosphere which is determined by the composition of the metal powder. Typically, a stream of hydrogen at atmospheric pressure, or alternatively a vacuum, may be utilized. The sintering temperature, which again depends upon the nature of the selected metal powder, Oranges from 700° to 1400° C., for a time in the range of about 0.5 to 3 hours, to thereby obtain a porous metal component.

The variables controlling the sintered dimensions include the degree and uniformity of shrinkage during sintering, the density of the green part and the dimensions of the pressed green part.

The product and process of the invention will now be described with reference to the following non-limitative examples.

EXAMPLE I

The following is an example of how the process of tape casting and lamination can be used to make a porous metal part.

A coarse copper powder having a median particle size ($D_{50}$) of 77 microns, Menhaden fish oil (dispersant), toluene and ethanol were placed in a milling Jar in the fractions indicated in Table 1 given herebelow. The milling Jar was fabricated from nylon and the milling media consisted of nickel balls. The mixture was then milled for 1 hour. A suitable binder, in this case PVB B79 and a plasticizer, in this case Santicizer160™ (butylbenzyl polyphthalate), were added to the mill in the ratio indicated in Table 1. This mixture was milled for 4 hours to dissolve the binder and plasticizer and obtain a homogeneous mixture. The slurry was cast onto a Mylar™ film using a doctor blade. The tape was dried in air under a fume hood for at least 24 hours. The dried thickness averaged 0.3 mm. Preforms were cut from the tape and a predetermined number of layers were placed in a die. The filled die was placed in a press and the layers of tape were laminated together using pressures between 18 and 24 MPa. This pressure was held for between 5 to 10 minutes and pressing was done at approximately 75° C. The final laminate was cut using a specifically designed cutter. The green body was placed in a furnace and all the organic additives were burned off by heating the green parts in a stream of air according to the schedule listed in Table II given herebelow. At this point the parts were fairly fragile. They were carefully transferred to a sintering furnace. The samples were inserted into a hot zone of furnace which was at 500° C. After one hour the temperature was ramped to 800° C. at 5° C. per minute and held for one hour. The samples were then removed to the cooling zone and allowed to cool. The sintering atmosphere was hydrogen at atmospheric pressure.

The average porosity of the disc was thirty percent.

TABLE I

| COMPOUND | WEIGHT % (in suspension) | VOLUME % (in dried tape) |
|---|---|---|
| Alcan 301 Copper | 70.5 | 20.4 |
| Menhaden Fish Oil | 1.0 | 8.1 |
| Toluene | 7.5 | 32.5 |
| Ethanol | 4.7 | 24.8 |
| Santicizer 160 ™ | 1.1 | 2.6 |
| PVB B79 | 3.8 | 8.9 |

TABLE II

| Temperature Range (°C.) | Action | Heating Rate (°C./min) | Hold Time at Maximum Temperature (min.) |
|---|---|---|---|
| 25–140 | heating | 1.0 | 60 |
| 140–150 | heating | 0.1 | 90 |
| 150–170 | heating | 0.1 | 90 |
| 170–190 | heating | 0.1 | 60 |
| 190–230 | heating | 0.1 | 60 |
| 230–350 | heating | 0.1 | 60 |
| 350–RT | cooling | furnace cool | — |

Table II provides a burnout schedule used for copper green parts, burnout being carried out in air at atmospheric pressure.

The tensile test results are illustrated in Table III given below:

TABLE III

| Sample | Maximum Load (N) | Tensile Stress (MPa) | Yield Load (N) | Yield Stress (MPa) |
|---|---|---|---|---|
| 1 | 62 | 15,600 | — | — |
| 2 | 69 | 13,100 | 52 | 9,800 |
| 3 | 64 | 11,900 | 52 | 9,500 |
| 4 | 61 | 11,500 | 47 | 8,700 |

EXAMPLE II

The following is an example of how the process of tape casting and lamination with the addition of a pore forming agent can be used to make a porous metal part having controlled microporosity.

A fine copper powder having a particle size wherein $D_{50}$ is 19 microns, Menhaden fish oil (dispersant), toluene and ethanol were produced in a milling jar in the fractions indicated in Table 1 given above.

Cornstarch, the pore forming agent was added to the pension in the amount of 11.3 weight percent, which was divalent to 27 volume percent in the dried tape.

The process was carried out according to the procedure of Example I. The average porosity of the disc was forty percent.

The improved tensile test results are illustrated in Table IV given below.

TABLE IV

| Sample | Maximum Load (N) | Tensile Stress (MPa) | Yield Load (N) | Yield Stress (MPa) |
|---|---|---|---|---|
| 5 | 270 | 55,500 | 205 | 42,200 |
| 6 | 295 | 60,100 | 205 | 41,800 |
| 7 | 291 | 59,200 | 225 | 45,700 |

It will be understood, of course, that other embodiments and examples of the invention will be readily apparent to a person skilled in the art, the scope and purview of the invention being defined in the appended claims.

The embodiments in which an exclusive property or privilege are claimed are defined by the claims which now follow:

1. A process for the preparation of a porous metal component which comprises the sequential steps of:

preparing a colloidal suspension comprising at least one metal powder having a particle size less than 300 microns, in admixture with a binder system, a plasticizer, and a solvent selected to provide preselected pliability properties;

casting said colloidal suspension into a thin sheet;

drying said sheet to thereby form a tape having high green strength;

layering a predetermined number of tape layers, and compacting said layers at pressures ranging from between about 5 to 60 MPa at temperatures in the range of between about 25° to 80° C. for a time effective to laminate said layers of tape and form a green body;

heating said green body at a controlled rate, at temperatures effective to remove the pyrolysable additives and then further heating to sintering temperatures in the range of between about 700° to 1400° C. to thereby form a metal component.

2. A process as set forth in claim 1 wherein said metal powder is selected from nickel, copper, cobalt, titanium, molybdenum or composite powders or mixtures thereof, in the range of about 5 to about 60 volume percent of the colloidal suspension.

3. A process as set forth in claim 1 wherein said binder system is a binder comprising polymerized alcohols, butyryl resins or acrylic resins in an amount in the range of from 5 to 10 weight percent of the colloidal suspension.

4. A process as set forth in claim 1 wherein said metal powder is nickel, copper, cobalt, titanium, molybdenum or composite powders or mixtures thereof; said binder system is selected from a binder comprising polymerized alcohols, butyryl resins or acrylic resins; said plasticizer is butylbenzyl phthalate, polyethylene glycol, diethylene phthalate or triethylene phthalate; and said solvent is toluene, methyl ethyl ketone, ethanol, isopropanol, methanol.

5. A process as claimed in claim 1 in which the binder system additionally comprises a dispersant selected from the group consisting of phosphate esters, ethoxylate of castor oil and polyethylene oxyethanol in an amount in the range of 0.5 to 10 weight percent of the colloidal suspension.

6. A process as claimed in claim 1, layering a predetermined number of shaped tape layers.

7. A process as set forth in claim 1 wherein said plasticizer is butylbenzyl phthalate, polyethylene glycol, diethylene phthalate or triethylene phthalate in an amount in the range of about 1.5 to 5 weight percent of the colloidal suspension.

8. A process as set forth in claim 1 wherein said solvent is toluene, methyl ethyl ketone, ethanol, isopropanol, methanol, hexane, ethyl acetate, or trichloroethylene or mixtures thereof in an amount in the range of about 25 to 35 weight percent of the colloidal suspension.

9. A porous metal component having controlled microporosity produced by a process which comprises the sequential steps of:
    preparing a colloidal suspension comprising at least one metal powder having a particle size less than 300 microns, in admixture with a binder system, a plasticizer, a solvent and a pyrolysable, particulate pore-forming agent;
    casting said colloidal suspension into a thin sheet;
    drying said sheet to thereby form a tape having preselected pliability properties;
    layering a predetermined number of tape layers, and compacting said layers at pressures ranging from between about 5 to 60 MPa at temperatures in the range of between about 25° to 800° C. for a time effected to laminate said layers of tape and form a green body;
    heating said green body at a controlled rate, at temperatures effective to remove the pyrolysable additives and form a brown body; and
    sintering said brown body at a temperatures in the range of between about 700° to 1400° C. to thereby form a porous metal structure.

10. A porous metal component as claimed in claim 9, wherein said metal powder is selected from nickel, copper, cobolt, titanium, molybdenum or composite powders or mixtures thereof; said binder system is selected from a binder comprising polymerized alcohols, butyryl resins or acrylic resins; said plasticizer is selected from butylbenzyl phthalate, polyethylene glycol, diethylene phthalate or triethylene phthalate; and said solvent is selected from toluene, methyl ethyl ketone, ethanol, isopropanol, methanol, hexane, ethyl acetate, or trichloroethylene or mixtures thereof and wherein said pyrolsable, particulate pore-forming agent is selected from cornstarch, graphite, polyethylene, or polypropylene.

11. A porous metal component having controlled macroporosity produced by a process which comprises the sequential steps of:
    preparing a colloidal suspension comprising at least one metal powder having a particle size less than 300 microns, in admixture with a binder system, a plasticizer, and a solvent;
    casting said colloidal suspension into a thin sheet;
    drying said sheet to thereby form a tape having preselected pliability properties; layering a predetermined number of tape layers, and providing a pyrolysable, pore-forming agent in association with said layers prior to compacting said layers at pressures ranging from between about 5 to 60 MPa at temperatures in the range of between about 25° to 80° C. for a time effective to laminate said layers of tape and form a green body;
    heating said green body at a controlled rate, at temperatures effective to remove the pyrolysable additives and form a brown body; and
    sintering said brown body at temperatures in the range of between about 700° to 1400° C. to thereby form a porous metal component.

12. A porous metal component as claimed in claim 11, wherein said metal powder is selected from nickel, copper, cobalt, titanium, molybdenum or composite powders or mixtures thereof; said binder system is selected from a binder comprising polymerized alcohols, butyryl resins or acrylic resins; said plasticizer is butylbenzyl phthalate, polyethylene glycol, diethylene phthalate or triethylene phthalate; said solvent is toluene, methyl ethyl ketone, ethanol, isopropanol, methanol, hexane, ethyl acetate, or trichloroethylene or mixtures thereof and wherein said pyrolysable, pore-forming agent is ash-free paper, meshes, or fibres.

13. A porous metal component having controlled microporosity and macroporosity produced by a process which comprises the sequential steps of:
    preparing a colloidal suspension comprising at least one metal powder, having a particle size less than 300 microns, in admixture with a binder, a dispersant, a plasticizer, a solvent and a first pore-forming agent;
    casting said colloidal suspension into a thin sheet;
    drying said sheet to thereby form a tape having preselected pliability properties;
    layering a predetermined number of tape layers, and providing a second pyrolysable, pore-forming agent in association with said layers prior to compacting said layers at pressures ranging from between about 5 to 60 MPa at temperatures in the range of between about 25° to 800° C. for a time effective to laminate said layers of tape and form a green body;
    heating said green body at a controlled rate, at temperatures effective to remove the pyrolysable additives and form a brown body; and
    sintering said brown body at temperatures in the range of between about 700° to 1400° C. to thereby form a porous metal structure.

14. A process as set forth in claim 13 wherein said metal powder is selected from nickel, copper, cobalt, titanium, molybdenum or composite powder or mixtures thereof; said binder system is a binder comprising polymerized alcohols, butyryl resins or acrylic resins; said plasticizer is butylbenzyl phthalate, polyethylene glycol, diethylene phthalate or triethylene phthalate; said solvent is toluene, methyl ethyl ketone, ethanol, isopropanol, methanol, hexane, ethyl acetate, or trichloroethylene or mixtures thereof and wherein said first particulate pore-forming agent is cornstarch, graphite, polyethylene or polypropylene and said second pore-forming agent is ash-free paper, meshes, or fibres.

* * * * *